Figure 2:
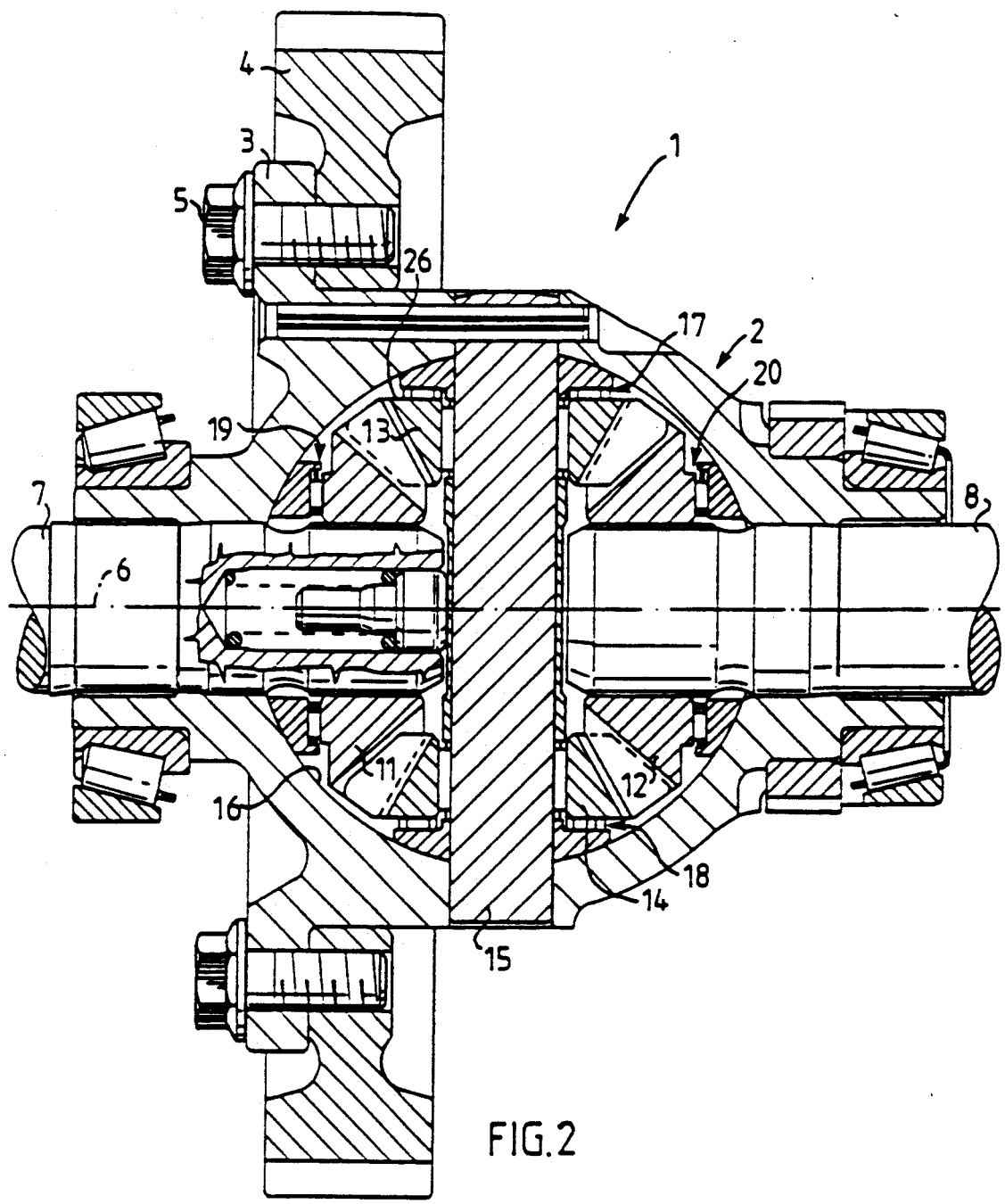

United States Patent [19]

Nordkvist

[11] Patent Number: 5,234,388
[45] Date of Patent: Aug. 10, 1993

[54] DIFFERENTIAL WITH GEAR SUPPORT PLATE AND BEARING

[75] Inventor: Kjell Nordkvist, Södertälje, Sweden

[73] Assignee: SAAB Automobile Aktiebolag, Sweden

[21] Appl. No.: 836,286

[22] PCT Filed: Sep. 12, 1990

[86] PCT No.: PCT/SE90/00581
§ 371 Date: Feb. 26, 1992
§ 102(e) Date: Feb. 26, 1992

[87] PCT Pub. No.: WO91/04425
PCT Pub. Date: Apr. 4, 1991

[30] Foreign Application Priority Data
Sep. 13, 1989 [SE] Sweden .............. 8903009

[51] Int. Cl.⁵ .............................. F16H 1/40
[52] U.S. Cl. ..................... 475/246; 475/230; 475/348
[58] Field of Search ........... 475/230, 246, 247, 334, 475/346, 348

[56] References Cited

U.S. PATENT DOCUMENTS

| | | | |
|---|---|---|---|
| 677,401 | 7/1901 | Dooley | 475/246 |
| 1,725,774 | 8/1929 | Zeithammer | 475/346 X |
| 2,408,926 | 10/1946 | Griffith | 475/246 X |
| 2,548,258 | 4/1951 | Griffith | 475/246 X |
| 2,566,601 | 9/1951 | Cousins | 475/246 |
| 2,578,155 | 12/1951 | Slider | 475/246 |
| 2,680,972 | 6/1954 | Tone | 475/247 X |
| 2,774,253 | 12/1956 | Minard et al. | 475/247 X |
| 3,199,375 | 8/1965 | Rosen et al. | 475/346 X |
| 3,779,102 | 12/1973 | Pfarrwaller | 475/244 |
| 3,874,251 | 4/1975 | Lapitsky et al. | 475/230 |
| 4,169,394 | 10/1979 | Estrada | 475/234 |

FOREIGN PATENT DOCUMENTS 459034 5/1989 Sweden.

Primary Examiner—Richard M. Lorence
Assistant Examiner—Benjamin Levi
Attorney, Agent, or Firm—Ostrolenk, Faber, Gerb & Soffen

[57] ABSTRACT

A differential (1) has a housing (2) made in one piece with two side openings (10) via which parts can be introduced into and removed from the housing. The pinion gears and side gears rest against the inside of the housing via respective support members (17-20). At least for the pinion gears (13,14) there is in the support member (17, 18) a bearing member (22) of the roller bearing type and a support plate (21), where the bearing member is intended to cooperate with, on the one hand, a first bearing surface (25) on the support plate and, on the other hand, a second bearing surface (26) on the actual pinion gear. Assembly of the support member is made possible by means of the fact that the side (24) of the support plate which is to rest against the inside (16) of the housing is convex.

18 Claims, 2 Drawing Sheets

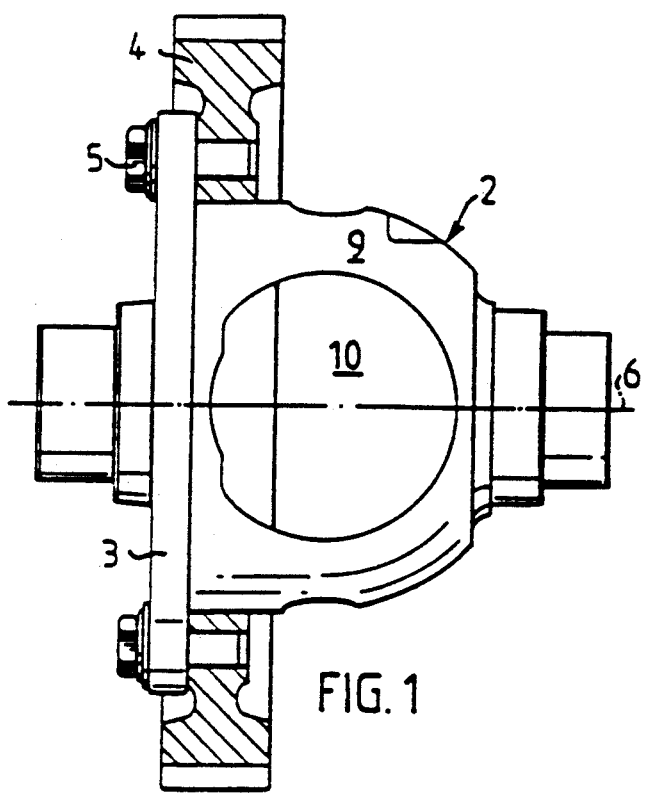
FIG. 1
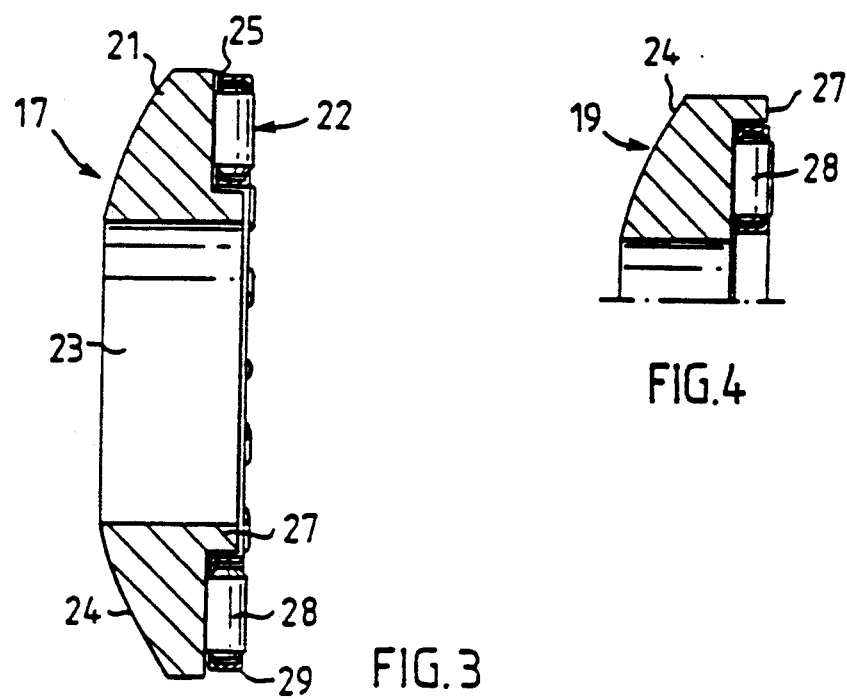
FIG. 3
FIG. 4

DIFFERENTIAL WITH GEAR SUPPORT PLATE AND BEARING

The invention relates to a differential, particularly for motor vehicles, with a differential housing made in one piece which has two side openings via which pinion gears and side gears can be introduced into and removed from the differential housing, and in which the pinion gears and side gears in the assembled position bear rotatably against the inside of the differential housing via respective support members.

Differentials of this type have preferably been used in motor vehicles of the passenger car type, where differentials with two pinion gears are required. The fact that the differential housing cannot be divided affords the advantage that the differential is compact and can be given a lower weight than a divisible differential with the same force stress, and it is simple to assemble. The support members which are used have consisted of wear plates, as a result of which bearings of the slide bearing type have been obtained. However, this has entailed the disadvantage that the internal friction in the differential can in some cases be so great that a differential gear can be prevented from rotating at fully developed friction. This is a problem primarily in powerful-engined cars in which the pinion gears are subjected to high forces in the axial direction. The result can then be that the car becomes unwieldy and runs off at an angle on acceleration, with the accident risk which this involves.

It is previously known per se to use roller bearings in differentials for the purpose of reducing friction, but in those cases where this has been carried out, the differential housing has been divisible in order to permit assembly of the roller bearings.

The aim of the invention is to improve a differential of the type mentioned in the introduction, in such a way that it acquires reduced friction, while at the same time retaining a simple and compact construction and a design which is easy to assemble.

This is achieved according to the invention in a differential of the type mentioned in the introduction by virtue of the fact that in each of two opposite support members there is, on the one hand, a bearing member in which bearing elements are intended to perform a rolling movement and, on the other hand, a support plate which is provided with a central shaft hole and whose one side has a convex shape adapted for application against the inside of the differential housing, and whose other side has a first bearing surface for the bearing member, that one end of the side gear or pinion gear resting against the support member has a second bearing surface for the bearing member, and that the support plate forms a guide in the radial direction for the bearing member.

According to an advantageous embodiment of such a differential, the support plate has a collar projecting in the axial direction for guiding the bearing member in the radial direction. This collar can be situated either radially to the inside or radially to the outside of the bearing member.

The one convex side of the support plate can advantageously be spherical.

A design according to the invention makes it possible to give the differential improved properties in respect of friction, while at the same time retaining a differential housing of standard type. A further advantage is that the components forming part of the differential are easy to manufacture and assemble.

The invention is described in greater detail below with reference to an exemplary embodiment shown in the attached drawing, in which:

FIG. 1 shows a side view of a differential housing for a differential according to the invention, provided with a crown wheel, FIG. 2 shows a longitudinal section through a differential according to the invention, FIG. 3 shows a first type of support member for the differential in FIG. 2, and FIG. 4 shows a second type of support member for the differential in FIG. 2.

A differential 1 according to the invention has a differential housing 2 made in one piece which is provided with a round flange 3 on which a crown wheel 4 is secured with the aid of a number of bolts 5. The crown wheel 4 is intended to be rotated together with the differential housing 2 in a conventional manner about the axis of rotation 6 of the differential housing. Two output shafts 7 and 8 mounted rotatably in the differential housing 2 can in this way be made to rotate, if appropriate at different speeds.

Given that the general construction of the differential is well known, only those parts of the differential which are essential for an understanding of the invention will be described herein below.

The differential housing 2 has in its wall 9 two relatively large, opposite side openings 10, via which components to be accommodated in the differential housing can be introduced into and removed from the differential housing. This type of differential housing constitutes a standard type, for example in the motor industry. In a conventional manner the output shafts 7 and 8 are connected fixed in terms of rotation to respective side gears 11 and 12 which are mounted rotatably in the differential housing 2 and which in turn are in engagement with two pinion gears 13 and 14, which are rotatably arranged on a differential shaft 15. The pinion gears 13 and 14 rest against the inside 16 of the differential housing via respective support members 17 and 18. Corresponding support members 19 and 20 are provided on the side gears 11 and 12.

The more detailed design of a support member is illustrated in FIG. 3, which shows one support member 17. In this support member 17 there is a support plate 21 and a bearing member 22 cooperating with the latter. The support plate 21 is provided with a central shaft hole 23, in this case for the differential shaft 15, and has on its one side a convex surface 24 for application against the inside 16 of the differential housing 2. The other side of the support plate has a first bearing surface 25 for the bearing member 22, which is intended to rest with its opposite side directly against one end of the pinion gear 13, which for this purpose has a second bearing surface 26 intended for the bearing member 22 (see FIG. 2). The support plate 21 forms a guide in the radial direction for the bearing member 22 and is for this purpose provided with an axially projecting collar 27. According to FIG. 3, this collar 27 can be situated radially to the inside of the bearing member 22, as is the case for support members 17 and 18, but it can also be situated, according to FIG. 4, radially to the outside of the bearing member 22, as is the case for support members 19 and 20. In order to facilitate the relative turn between the support plate 21 and the bearing member 22, there is expediently a certain play between the collar 27 and the bearing member 22.

The bearing member 22 is a roller bearing member in which a number of bearing elements 28 are intended to perform a rolling movement and are held in a desired relative position with the aid of a bearing element holder 29. In the case shown, each bearing element 28 consists of an elongate cylindrical body, which has its longitudinal axis oriented radially relative to the support plate 21. The bearing formed can thus be said to be of the needle bearing type. The bearing surfaces, for example 25 and 26, with which the bearing elements are in contact, are in this case oriented at right angles to the axis of rotation of the differential gears or differential wheels which are supported by the support members. However, it is of course possible to choose another design in which the bearing elements 28 have another shape and in which the bearing surfaces have another design and orientation.

The convex surface 24 of the support plate 21, which is intended to rest against the inside 16 of the differential housing, can advantageously have a spherical shape like the corresponding section of the inside 16, but it is also possible, for example, for the convex surface 24 to be made up of two or more adjacent cone surface sections. However, it is important that the shape should be such that assembly of at least the pinion gears 13 and 14 can be carried out via the side openings 10 in the differential housing. These pinion gears 13, 14 with associated support members must, on assembly via each side opening 10, be brought into engagement with the side gears 11 and 12 mounted in the differential housing, after which the pinion gears 13, 14 and side gears 11, 12 are rotated as a unit in the circumferential direction of the differential housing while the support members arranged on the rear side of the pinion gears 13, 14 slide against the inside of the differential housing. The inside of the differential housing must therefore have a shape which is rotationally symmetrical relative to the axis of rotation 6 in order to make it possible for the pinion gears, during simultaneous engagement with the side gears, to be rotated to the correct position in the differential housing.

The support plates 21 can be produced by machining of solid material pieces, but they can also be formed in another way, for example by powder forging.

The necessary bearing surface to the rear of the side gears and pinion gears can be produced, for example, by modifying side gears and pinion gears previously used normally but having a convex end face, so that a bearing surface of the desired shape is obtained. Inexpensive standard parts can be used in this way. However, it is also possible to use instead specially manufactured parts.

The differential shown is provided with only two pinion gears, but where required the number of pinion gears can be doubled, for example according to the embodiment described in Swedish patent application No. 8801608-4, in which support members of the type described above can expediently be used, at least for the pinion gears which, with the associated support members, must be rotated into position in the differential housing while sliding against the inside of the housing.

In those cases where the pinion gears 13 and 14 are so small that surface machining of the rear side of the pinion gears results in these becoming too weak in terms of stability, a modified solution must be chosen. In this alternative solution, the contact surface of the pinion gear in the housing is also machined to a plane surface, and the machining of the rear side of the pinion gear is reduced to a corresponding extent, which results in a stronger pinion gear. In such a differential housing with machined contact surfaces for the rear sides of the pinion gears 13 and 14, the pinion gears are mounted with a plane support plate and bearing member, while the side gears are mounted with the support plates and bearing members according to the invention. Upon assembly, the pinion gears 13, 14 are first introduced into the differential housing via the respective side opening 10, after which the side gears 11 and 12 are brought into simultaneous engagement with the pinion gears 13 and 14 mounted in the differential housing, after which the side gears 11, 12 and the pinion gears 13, 14 are rotated as a unit in the differential housing about an axis parallel to the differential shaft 15 while the support members arranged on the rear side of the side gears 11, 12 slide against the inside of the differential housing. The inside of the differential housing must therefore have a shape which is rotationally symmetrical relative to the differential shaft 15 in order to make it possible for the side gears, during simultaneous engagement with the pinion gears, to be rotated to the correct position in the differential housing.

The invention is therefore not limited to comprising only a bearing according to the invention of both pinion gears 13, 14 and side gears 11 and 12. Combinations in which only the side gears 11, 12 or only the pinion gears 13, 14 or only one pinion gear pair in a four-pinion differential use the bearing according to the invention are also embraced by the bearing according to the invention.

I claim:

1. A differential for motor vehicles, or the like uses, comprising:
   a differential housing made in a single piece; the housing being hollow and defining an inside which surrounds and defines a hollow space;
   a first and a second output shaft projecting in different directions from inside the housing; a first side gear on the first output shaft and a second side gear on the second output shaft, the first and second side gears being inside the housing;
   a differential shaft transverse to the output shaft and in the housing; a first pinion around the differential shaft and engaging both of the first and second side gears; a second pinion around the differential shaft, spaced from the first pinion and engaging both of the first and second side gears, the first and second pinions being inside the housing;
   a respective support plate for at least one of the gears, the support plate having a hole therethrough through which the respective shaft for the respective gear passes;
   the support plate having a first side which directly contacts the inside of the differential housing; the support plate having a second side opposite from the first side thereof, the second side of the support plate having a first bearing surface;
   the inside of the differential housing being generally spherically shaped and the first side of the support plate being generally convexly shaped and directly contacting the inside of the housing;
   the respective gear at the support plate having a second bearing surface which faces toward the first bearing surface of the support plate;

bearing means supported between the first and second bearing surfaces to perform rolling movement with respect to the first and second bearing surfaces as the respective gear and the respective support plate rotate with respect to each other.

2. The differential of claim 1, wherein the two side gears are opposite each other in the housing, and the two pinions comprise two additional gears that are opposite each other in the housing;

the differential comprising two of the support plates, including a respective one of the support plates for each of two of the pinion and side gears which are opposite one another; the differential further comprising a respective bearing means at the respective first and second bearing surfaces for each of the pinion and side gears and the respective support plates thereof.

3. The differential of claim 1, wherein there is a respective one of the support plates for each of the two side gears and a respective bearing means at the respective first and second bearing surfaces for each of the side gears and the respective support plates thereof.

4. The differential of claim 1, wherein there is a respective one of the support plates for each of the two pinions and a respective bearing means at the respective first and second bearing surfaces for each of the pinions and the support plates thereof.

5. The differential of claim 1, wherein there is a respective one of the support plates for each of the gears and a respective bearing means at the respective first and second bearing surfaces for each gear and its respective support plate.

6. The differential of claim 2, further comprising a guide defined on the support plate for guiding the bearing member in the radial direction.

7. The differential of claim 2, wherein the bearing means comprises at least one rotatable rolling member oriented generally radially of the respective gear and the support plate thereof and being rotatable circumferentially as the gear and the support plate rotate relative to one another.

8. The differential of claim 2, further comprising means on the support plate for supporting the bearing means.

9. The differential of claim 2, wherein the differential housing has at least one side opening through which the gears can be introduced into the housing and removed from the housing.

10. The differential of claim 9, wherein there are two of the side openings spaced apart around the differential housing.

11. The differential of claim 2, wherein there is a guide that comprises a collar which is on the support plate and which projects in the axial direction from the support plate toward the respective gear, and the collar is positioned for guiding the bearing means in the radial direction.

12. The differential of claim 11, wherein the bearing means comprises at least one rotatable rolling member oriented generally radially of the respective gear and the respective support plate and the rolling member being rotatable circumferentially as the gear and the support plate rotate relative to one another.

13. The differential of claim 12, wherein the collar on at least one of the support plates is disposed radially inwardly of the bearing means with reference to the respective gear.

14. The differential of claim 12, wherein the collar on at least one of the support plates is disposed radially outwardly of the bearing means with reference to the respective gear.

15. The differential of claim 1, wherein the inside of the housing is generally spherically curved and the first convex side of the support plate is generally spherically curved so as to generally mate with the spherical curvature of the inside of the housing.

16. The differential of claim 2, wherein the support plate is formed by powder forging.

17. The differential of claim 2, further comprising a crown wheel on the differential housing to rotate the housing generally around an axis of rotation for the output shafts.

18. A differential for motor vehicles, or the like uses, comprising:

a differential housing made in a single piece; the housing being hollow and defining an inside which surrounds and defines a hollow space;

a first and a second output shaft projecting in different directions from inside the housing; a first side gear on the first output shaft and a second side gear on the second output shaft, the first and second side gears being inside the housing;

a first bearing surface supported at the inside of the differential housing for at least one of the gears; the respective at least one gear having a second bearing surface which faces toward the first bearing surface;

said first and said second bearing surfaces being oriented generally at right angles to the rotational axis for said gears;

bearing means supported between the first and second bearing surfaces to perform rolling movement in a plane generally at right angles to the rotational axis of said gears with respect to the first and second bearing surfaces as the at least one gear rotates with respect to the housing.

* * * * *